United States Patent [19]

Oasheim

[11] Patent Number: 4,829,694
[45] Date of Patent: May 16, 1989

[54] PORTABLE BIRD-SHAPED BLIND

[76] Inventor: Gregory S. Oasheim, 3100 James Ave. S., Minneapolis, Minn. 55408

[21] Appl. No.: 208,297

[22] Filed: Jun. 17, 1988

[51] Int. Cl.⁴ .............................................. A01K 31/06
[52] U.S. Cl. ................................................ 43/1; 43/2; 135/901; 135/101; 135/105; 135/109
[58] Field of Search ................... 43/1, 2; 135/901, 101, 135/102, 103, 104, 105, 106, 109

[56] References Cited

U.S. PATENT DOCUMENTS

| | | | |
|---|---|---|---|
| 395,189 | 12/1888 | Stanton | 43/1 |
| 586,145 | 7/1897 | Sievers | 43/1 |
| 2,501,517 | 3/1950 | Honald | 43/1 |
| 2,992,503 | 7/1961 | Webb | 43/1 |
| 3,888,032 | 6/1975 | Gagnon | 43/3 |
| 3,902,264 | 9/1975 | Radig | 135/2 |
| 4,164,089 | 8/1979 | George | 43/1 |
| 4,364,193 | 12/1982 | Visco | 43/1 |
| 4,581,837 | 4/1986 | Powuls | 43/1 |
| 4,651,458 | 3/1987 | Lanius | 43/3 |
| 4,683,672 | 8/1987 | Davis | 43/1 |
| 4,716,918 | 1/1988 | Hayashida et al. | 135/105 |
| 4,745,936 | 5/1988 | Scherer | 135/105 |
| 4,751,936 | 6/1988 | Zibble et al. | 135/901 |

Primary Examiner—Nicholas P. Godici
Assistant Examiner—Michael William Starkweather

[57] ABSTRACT

An all weather portable blind having a breast-body segment and a tail-body segment constructed of a waterproof fabric stretched over lightweight flexible wands. The breast body segment overlaps the tail body segment because the tail has a smaller arc, a stay in the rear apex of the breast and a quickly releasable connection, like a Fastex #SR1 snap buckle, held in tension by an elastic cord staked into the ground. The combination appears as a goose and is large enough to hold a hunter. The breast overlaps the tail and the gap permits a rear view, a sphincter opening in the breast provides a forward view. The breast also has an inflatable neck and head that in combination with rings and releasable straps can change positions.

5 Claims, 3 Drawing Sheets

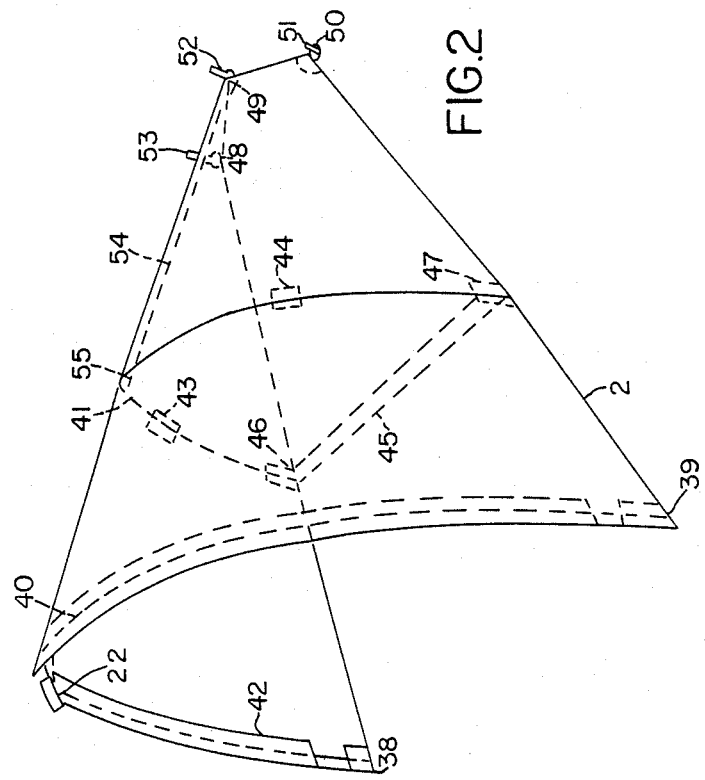

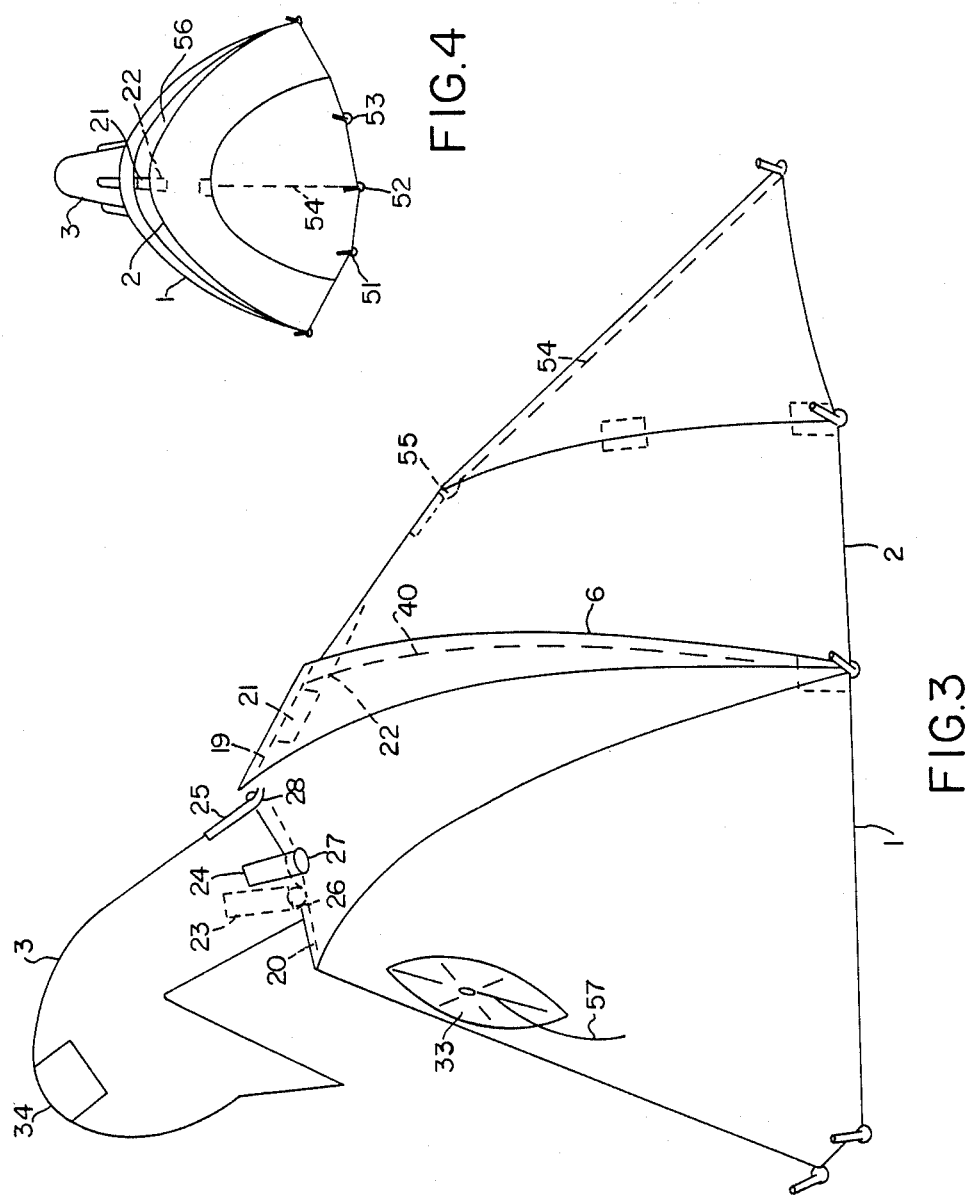

PORTABLE BIRD-SHAPED BLIND

BACKGROUND OF THE INVENTION

The hunting of birds and animals frequently requires a form of concealment. The traditional approach has been to use either camouflage and blend with the surroundings or to appear as a non threatening shape. Variations in terrain and in enviornmental conditions are the main problems associated with camouflage. The same field appears different when dry, wet or snow-covered. This requires the hunter to cover himself with dirt, snow, or a combination of colored fabric and special clothing. Until now, the problem with blinds that appear as non threatening shapes is that they are heavy, cumbersome, hard-shell forms with limited vision, which force the hunter to maintain uncomfortable positions while hunting.

SUMMARY OF THE INVENTION

Consequently, it is the object of this invention to provide a lightweight blind that appears as a goose, allows clear vision in any direction, provides total weather protection, permits varied body positions, and can be collapsed instantly.

BRIEF DESCRIPTION OF THE DRAWINGS

FIG. 2 is a perspective showing the side and interior of tail body segment.

FIG. 3 is a perspective showing the tail and breast body segment connected, and the head in a relaxed, erect position. The sphincter opening is shown closed.

FIG. 4 is a perspective showing the rear viewing gap between the tail and breast body segments.

DESCRIPTION OF THE PREFERRED EMBODIMENTS

Figure 1:
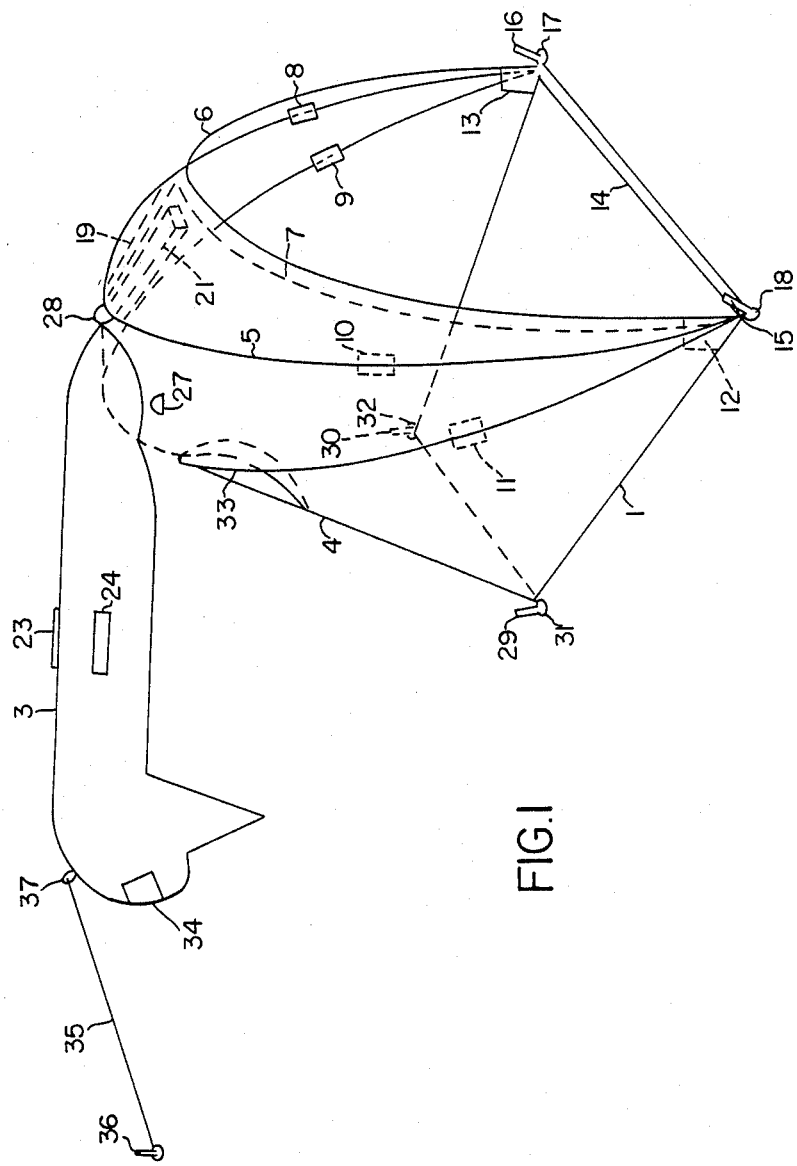
FIG. 1 is a perspective showing the side and interior of the breast-body segment and showing the head in the feeding position with the sphincter opening at the front of the breast in the open position.

The objects are accomplished by the use of correctly-colored waterproof fabric, cut and sewn in two shapes that, when attached to lightweight flexible wands and connected, create a goose large enough to hold a hunter.

Referring to FIG. 1, breast-body segment 1 is shown with wand 6 inserted into wand sleeve 7 and ending at wand end pockets 12 and 13. FIG. 1 further shows wand 4 passing through wand guide loops 9 and 11 and wand 5 passing through wand guide loops 8 and 10. Wands 4 and 5 terminate at wand end pockets 12 and 13. Wands 4, 5 and 6 are held in an arc by arch support strap 14. Breast 1 is staked to the ground by passing stakes 16, 18, 29 and 30 through stake loops 15, 17, 31 and 32. FIG. 3 also shows head 3 in the feeding position staked out using stake 36 and line 35 tied to loop 37. The head 3 may be inflated with a balloon (not shown) through a hole covered by flap 34.

Referring to FIG. 2, tail-body segment 2 shows flexible wand 40 inserted in wand sleeve 42 and terminating at wand end pockets 38 and 39. FIG. 2 also discloses wand 41 passing through wand guide loops 43 and 44 and terminating at wand end pockets 46 and 47. Wand 41 is held in an arc by arch support strap 45. FIG. 2 further discloses retractable means 54 attached to ring 55 passing through loop 49 and staked to the ground using stake 52. Tail 2 is staked to the ground using stakes 51 and 53 passing through stake loops 50, and 48 respectively.

Referring to FIG. 3, tail-body segment 2 is connected to breast-body segment 1 by uniting male releasable connector 22 with female releasable connector 21. Wand 40 in tail 2 fits concentrically inside breast 1 and is held in an arc by the lower rear portion of the walls of breast-body segment 1. FIG. 3 also discloses rings 26, 27, and 28 and straps 23, 24, and 25 holding the head 3 in an erect position. VELCRO straps work best. The sphincter opening 33 is shown in the closed position with drawcord 57. The head 3 can be placed in the feeding position by releasing straps 23, 24, and 25 from rings 26, 27, and 28 and staking it forward with line 35 tied to loop 37 and stake 36. Further, FIG. 3 shows stays 19 and 20 at the apex of the breast 1. Stay 19 provides the overlap of tail 2 and stay 20 provides support for the head 3.

Referring to FIG. 4, tail-body section 2 and breast-body section 1 are connected and positioned to show rear viewing gap 56.

Referring to FIGS. 1, 2, 3, and 4, the blind is erected by inserting all the wands into their respective sleeves, loops, and end pockets and connecting the female releasable connector 21 to the male releasable connector 22. The FASTEX #SR1 snap buckle works best. The lower ends of wand 40 in tail-body segment 2 are placed inside the rear, lower portion of the walls of breast-body segment 1. Stakes 29 and 30 are placed first, the base is pulled taught and stakes 16 and 18 are placed. Next the tail is pulled rearward and staked in place with stakes 51 and 53. The elastic cord 54 extends from ring 55 rearward through loop 49 and is staked in place with stake 52. A balloon is lowered through the hole under flap 34 on head 3 and inflated to give the head and neck its shape.

The hunter enters by pulling either end of tail wand 40 from inside breast-body segment 1 and swinging it sideways and away from the ground like a door. There is no reason to disconnect the releasable connection. Once inside the hunter tucks the free end of wand 40 back inside breast-body segment 1. The blind is designed for rear view through gap 56 and forward view through sphincter opening 33. The hunter, when ready to shoot, releases male releasable connector 22 from female releasable connector 21. Tail-body segment 2 is pulled rapidly rearward from the hunter by elastic cord 54, breast-body segment 1 falls forward leaving the hunter free to shoot instantly in any direction.

While the above description contains many specifications these should not be construed as limitations on the scope of the invention. Many other variations exist including size and shape. It should also be obvious that it could be erected on a portable structure. Other uses could include scientific observation and photography.

I claim:

1. A portable decoy-shaped blind comprising: (a) two opposing concentrically overlapping and substantially unconnected body segments, whereby the rear segment is concentrically and overlappingly positioned within the front segment, thereby creating a rearward viewing gap; and (b) a means to retractably connect the rear segment to the front segment, wherein the rear segment can be retracted flatly upon the ground to allow the user's egress.

2. The blind in claim 1 wherein at least one of said segments has a closable viewing hole.

3. The blind in claim 1 wherein one of said segments has a birdshaped head and neck.

4. The blind in claim 1 wherein said head and neck has means to facilitate the changing of positions.

5. The blind in claim 1 wherein said body segments comprise at least one flexible wand, a fabric cover with sleeve and guide loops to contain said flexible wand, means to retain said flexible wand in an arc, and means to engage said body segments to another surface.

* * * * *